Sept. 5, 1967  R. M. JENSEN  3,339,970
DUPLEX SUN VISOR SUPPORT MEANS
Filed May 10, 1965
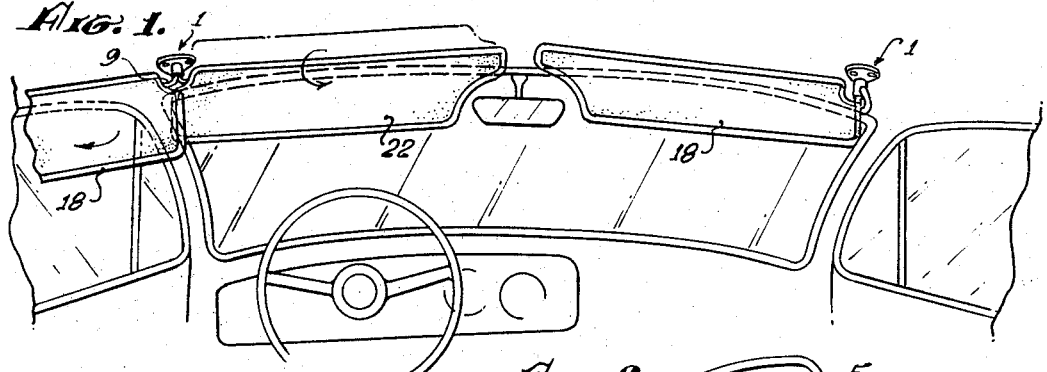
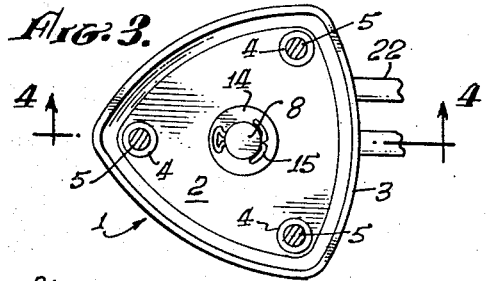
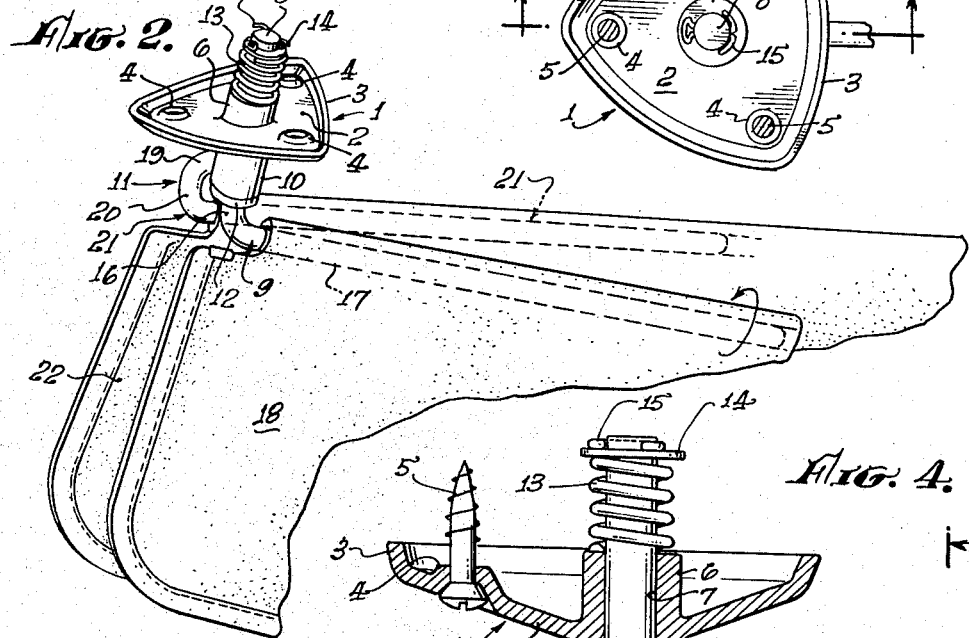
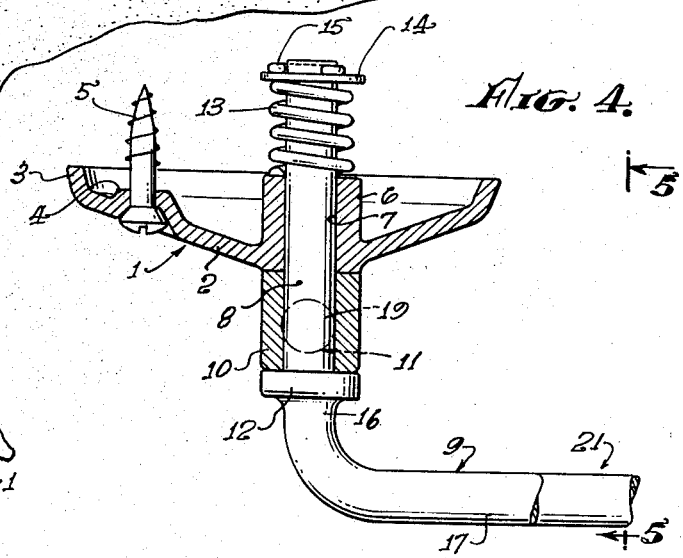
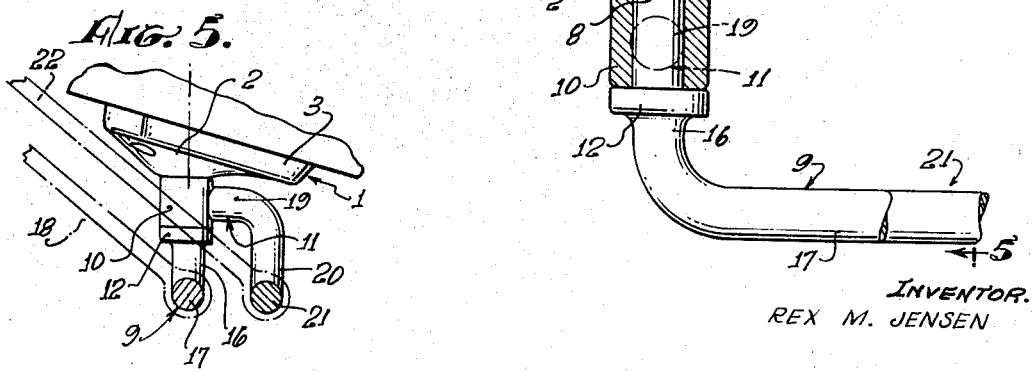
INVENTOR.
REX M. JENSEN
By Harold J. DeVesconte
ATTORNEY.

United States Patent Office 3,339,970
Patented Sept. 5, 1967

3,339,970
DUPLEX SUN VISOR SUPPORT MEANS
Rex M. Jensen, Torrance, Calif., assignor of one-half to Algerdas N. Cheleden, Sr., Glendale, Calif.
Filed May 10, 1965, Ser. No. 454,398
1 Claim. (Cl. 296—97)

This invention relates to sun visors for automobiles and more particularly to an improved, simple form thereof operable for shading either the upper portion of the windshield or the upper portion of the adjacent front side window or both.

Among the objects of the invention are: to provide a duplex sun visor unit for automotive vehicles having visor elements selectively movable from a storage position to positions of use adjacent the upper portions of the windshield and the adjacent side window; in which the supporting arm means for one visor element is employed, additionally, as the supporting pivot means for the other visor supporting arm; in which a single spring means serves to impose friction on both supporting arms whereby they are maintained in a position to which they may be moved; and in which the device may be installed at either or both sides of the vehicle passenger compartment.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is an interior view of the upper front portion of a motor vehicle driver compartment showing a pair of devices embodying the present invention mounted one each at each side thereof, FIG. 2 is a greatly enlarged fragmentary perspective view of the mounting portion of the embodiment shown at the left of FIG. 1 having both of the visors swung down from their respective supporting arms for clearness of illustration, FIG. 3 is a fragmentary, top plan view of the mounting means portion of the device, FIG. 4 is a further enlarged fragmentary medial sectional view taken on the line 4—4 of FIG. 3, and FIG. 5 is a cross sectional view on the approximate scale of FIG. 2 but taken on the plane of the line 5—5 of FIG. 4 and showing in broken lines the position occupied by the visors when not in use and swung upwardly into juxtaposition to the driver compartment ceiling.

Referring to the drawings, the illustrated embodiment of the invention comprises a base member 1 including a mounting flange component 2 of triangular configuration as viewed in plan, the edge of said flange being defined by a peripheral rib 3 defining a mounting plane engageable with the ceiling surface of the vehicle passenger compartment. Extending through said flange adjacent the apices of the said triangular configuration are countersunk holes 4 for reception of mounting screws 5 which usually are of the self-threading variety for self-threading in the rigid material forming the vehicle compartment ceiling and which is usually concealed beneath the fabric or other trim which lines the ceiling. Disposed substantially centrally of the mounting flange is an integrally formed visor arm supporting sleeve portion 6 which, as best shown in FIG. 4, is disposed at an angle to the plane defined by the roof engaging edge of the rib 3 whereby a rotative position of the base member can be found at which the bore 7 of the sleeve 6 will be disposed vertically at the location on the vehicle ceiling at which it is intended to mount the unit.

Journaled in the sleeve 6 is the bearing portion formed by the shank 8 of a first visor supporting arm 9, said shank being longer than the length of the bore 7 and below the lower end of the sleeve said shank serves as a bearing for the sleeve 10 which carries a second visor arm 11. Below the sleeve 10, the shank 8 of the first visor arm is provided with a peripheral flange 12 having an end face which engages the lower face of the sleeve 10 and above the upper end of the sleeve 6 of the base element, the shank 8 carries a compression spring 13 which is retained thereon by a washer 14 and cotter pin 15 which hold the spring compressed between the washer and the upper end of the sleeve 6 whereby the spring is caused to exert endwise force creating frictional resistance between the contacting end faces of the sleeve 6, the sleeve 10 and the flange 12 sufficient to simultaneously cause the shank 8 to remain in any rotative position to which it may be moved by adjustment of the arm 9 and the sleeve 10 to remain in any rotative position on the shank 8 to which it may be moved by rotative adjustment of the arm 11.

Below the flange 12, the arm 9 extends downwardly in a short vertical run 16 and thence extends laterally in a horizontal run 17 on which a rigid visor element 18 is carried by friction engagement therewith whereby the vistor may be swung to any desired position about the arm as is common usage in vehicle sun visors. The second visor supporting arm 11 extends laterally from the sleeve 10 thereof in a short horizontal run 19, thence downwardly in a short vertical run 20 to the level of the visor supporting run 17 of the first visor arm and thence extends horizontally at right angles to the run 19 in a visor supporting run 21 carrying a second visor 22 similarly mounted thereon for frictionally resisted turning movement. As best shown in FIG. 4, the lateral run 19 of the second visor supporting arm 11 serves to space the visor supporting run 21 thereof sufficiently away from and parallel to the visor supporting run 17 that when not in use, the visors can be swung up against the ceiling of the vehicle passenger or driver compartment.

In use and having reference first to the left hand side of FIG. 1 and to FIGS. 2 and 4, the first visor supporting arm 9 may be swung to a position parallel to the side window adjacent to the driver and the visor carried thereby swung down, after which the visor on the second visor arm 11 may be swung down across the upper portion of the windshield. Preferably, the distal end of the visor is provided with clearance to afford vision of the rear view mirror. Obviously also, where conditions warrant, only one or the other of the visors may be swung to a desired position.

Either one of the visors may be swung down across the windshield and either may be employed across the side window although the indicated use is that which is most convenient for the driver.

When it is desired to equip the vehicle with visors for both front seat occupants, the device can be as readily installed on the opposite side of the car, the only difference being that the visor arms will be reversed as to the windows normally protected thereby. Under these conditions, the arm 9 and its visor would be disposed closest to the windshield and would normally be used in that relation and vice versa. If desired, of course, the second visor arm 11 could be made in left and right hand versions but when installed, the difference would be so slight as to be almost unnoticeable and accordingly, the separate formation of right and left hand versions of the device is not deemed to be a practical necessity.

While in the foregoing specification there has been disclosed a presently preferred embodiment of the invention, the invention is not to be deemed to be limited to the precise details of construction thus disclosed by way of example and it will be understood that the invention includes as well all such changes and modifications in the parts and in the construction, combination and arrangement of parts as shall come within the purview of the appended claim.

I claim:

A duplex sun visor support means for a motor vehicle driver compartment defined in part by a windshield, a side window and a ceiling; said support means comprising a base member having means by which attaching devices may secure said base member to the compartment ceiling at a point thereon adjacent the juxtaposed side edges of the windshield and side window, a substantially vertically disposed sleeve portion constituting a tubular bearing carried by said base member, first and second horizontally extending visor supporting arms carried by said base member and including a bearing portion on said first arm journaled on said tubular bearing and a bearing portion on said second arm journaled on said bearing portion of said first arm, said arms having a capacity for movement in unison or independently about the axial line of said tubular bearing between positions adjacent and parallel to the inner surfaces of the windshield and side window, and a single spring interposed with an initial bias between a surface on said base member and an element movable with one of said arms operative by said initial bias to constantly apply frictional resistance to movement of said supporting arms about the axial line of said tubular bearing either in unison or independently one of the other, said bearing portion of said first visor supporting arm including an end portion extending through and upwardly beyond the upper end of said tubular bearing, said spring means comprising a compression spring surrounding said end portion above said tubular bearing, said spring being compressed with resultant creation of an initial bias between the upper end of said tubular bearing and a washer means secured on said portion of said first arm above said tubular bearing, the pivotal mounting of said second visor supporting arm on said bearing portion of said first arm being disposed below said tubular bearing and being held against axial movement thereon by engagement between the lower end of said tubular bearing and a collar means on said bearing portion of said first arm whereby the axial force exerted by the initial bias of said spring serves to provide independent frictional resistance to the pivotal mounting of either or both of said arms between said arms and said base member.

References Cited

UNITED STATES PATENTS

| | | | |
|---|---|---|---|
| 1,520,265 | 12/1924 | Thibodeau | 211—96 |
| 2,634,161 | 4/1953 | Beets | 296—97 |
| 2,917,186 | 12/1959 | Beets | 296—97 |

BENJAMIN HERSH, *Primary Examiner.*

J. A. PEKAR, *Assistant Examiner.*